(12) United States Patent
Nordkvist et al.

(10) Patent No.: US 9,505,057 B2
(45) Date of Patent: Nov. 29, 2016

(54) POWDER DISTRIBUTION IN ADDITIVE MANUFACTURING OF THREE-DIMENSIONAL ARTICLES

(71) Applicant: Arcam AB, Moelndal (SE)

(72) Inventors: Johan Nordkvist, Vaestra Froelunda (SE); Ulf Ackelid, Goeteborg (SE); Anders Snis, Uddevalla (SE)

(73) Assignee: Arcam AB, Moelndal (SE)

( * ) Notice: Subject to any disclaimer, the term of this patent is extended or adjusted under 35 U.S.C. 154(b) by 457 days.

(21) Appl. No.: 14/252,984

(22) Filed: Apr. 15, 2014

(65) Prior Publication Data

US 2015/0071809 A1    Mar. 12, 2015

Related U.S. Application Data

(60) Provisional application No. 61/874,733, filed on Sep. 6, 2013.

(51) Int. Cl.
*B22F 3/105* (2006.01)
*B23K 15/00* (2006.01)
(Continued)

(52) U.S. Cl.
CPC ............ *B22F 1/0014* (2013.01); *B22F 3/008* (2013.01); *B22F 3/1055* (2013.01); *B23K 15/0086* (2013.01); *B23K 26/342* (2015.10); *B28B 1/001* (2013.01); *B29C 67/0077* (2013.01);
(Continued)

(58) Field of Classification Search
CPC .... B22F 3/008; B22F 3/1017; B22F 3/1055; B22F 2003/1056; B23K 15/0086; B23K 26/342; B28B 1/001; B29C 67/0077; B33Y 10/00; B33Y 30/00; Y02P 10/295

USPC ................. 419/23, 53, 55; 264/497
See application file for complete search history.

(56) References Cited

U.S. PATENT DOCUMENTS 2,264,968 A    12/1941   De Forest
2,323,715 A     7/1943   Kuehni
(Continued)

FOREIGN PATENT DOCUMENTS

CA      2860188 A1    6/2006
CN    101635210 A    1/2010
(Continued)

OTHER PUBLICATIONS

International Search Report for PCT/EP2014/067095, mailed Mar. 13, 2015; 3 pages.*

(Continued)

*Primary Examiner* — Helene Klemanski
(74) *Attorney, Agent, or Firm* — Alston & Bird LLP

(57) ABSTRACT

The present invention relates to a method for forming a three-dimensional article through successive fusion of parts of at least one layer of a powder bed provided on a work table. Said method comprising the steps of: providing at least a first and second powder tank, providing a first type of powder in said first powder tank having a first particle size distribution, providing a second type of powder in said second powder tank having a second particle size distribution, providing a first sub-layer of said first type of powder on said work table, providing a second sub-layer of said second type of powder on top of said first layer of said first type of powder, fusing said first and second sub-layers simultaneously with a high energy beam from a high energy beam source for forming a first cross section of said three-dimensional article.

35 Claims, 7 Drawing Sheets

(51) Int. Cl.
    *B23K 26/342* (2014.01)
    *B28B 1/00* (2006.01)
    *B29C 67/00* (2006.01)
    *B22F 1/00* (2006.01)
    *B22F 3/00* (2006.01)
    *B33Y 10/00* (2015.01)
    *B33Y 30/00* (2015.01)

(52) U.S. Cl.
    CPC *B22F2003/1056* (2013.01); *B22F 2003/1059* (2013.01); *B33Y 10/00* (2014.12); *B33Y 30/00* (2014.12); *Y02P 10/24* (2015.11); *Y02P 10/295* (2015.11)

(56) References Cited

U.S. PATENT DOCUMENTS

| | | |
|---|---|---|
| 3,882,477 A | 5/1975 | Mueller |
| 4,348,576 A | 9/1982 | Anderl et al. |
| 4,401,719 A | 8/1983 | Kobayashi et al. |
| 4,818,562 A | 4/1989 | Arcella et al. |
| 4,863,538 A | 9/1989 | Deckard |
| 4,927,992 A | 5/1990 | Whitlow et al. |
| 5,167,989 A | 12/1992 | Dudek et al. |
| 5,182,170 A | 1/1993 | Marcus et al. |
| 5,204,055 A * | 4/1993 | Sachs ............... B22F 3/008 264/113 |
| 5,247,560 A | 9/1993 | Hosokawa et al. |
| 5,483,036 A | 1/1996 | Giedt et al. |
| 5,511,103 A | 4/1996 | Hasegawa |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,419,203 B1 | 7/2002 | Dang |
| 6,554,600 B1 | 4/2003 | Hofmann et al. |
| 6,583,379 B1 | 6/2003 | Meiners et al. |
| 6,746,506 B2 * | 6/2004 | Liu ............... B22F 1/0003 75/228 |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,540,738 B2 | 6/2009 | Larsson et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 * | 7/2010 | Abe ............... B22F 3/1055 264/497 |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,187,521 B2 | 5/2012 | Larsson et al. |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,310,188 B2 | 4/2016 | Snis |
| 2002/0104973 A1 | 8/2002 | Kerekes |
| 2002/0152002 A1 | 10/2002 | Lindemann et al. |
| 2003/0133822 A1 | 7/2003 | Harryson |
| 2004/0084814 A1 | 5/2004 | Boyd et al. |
| 2004/0104499 A1 | 6/2004 | Keller |
| 2004/0173496 A1 | 9/2004 | Srinivasan |
| 2004/0173946 A1 | 9/2004 | Pfeifer et al. |
| 2005/0186538 A1 | 8/2005 | Uckelmann |
| 2006/0108712 A1 | 5/2006 | Mattes |
| 2006/0145381 A1 | 7/2006 | Larsson |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0175875 A1 | 8/2007 | Uckelmann et al. |
| 2007/0182289 A1 | 8/2007 | Kigawa et al. |
| 2007/0298182 A1 | 12/2007 | Perret et al. |
| 2008/0236738 A1 | 10/2008 | Lo et al. |
| 2009/0017219 A1 | 1/2009 | Paasche et al. |
| 2009/0152771 A1 | 6/2009 | Philippi et al. |
| 2010/0310404 A1 | 12/2010 | Ackelid |
| 2011/0133367 A1 | 6/2011 | Weidinger et al. |
| 2011/0293770 A1 * | 12/2011 | Ackelid ............... B29C 67/0077 425/174.4 |
| 2011/0309554 A1 | 12/2011 | Liska et al. |
| 2011/0316178 A1 | 12/2011 | Uckelmann |
| 2012/0100031 A1 | 4/2012 | Ljungblad |
| 2012/0164322 A1 * | 6/2012 | Teulet ............... B22F 3/1055 427/180 |
| 2012/0193530 A1 | 8/2012 | Parker et al. |
| 2012/0223059 A1 | 9/2012 | Ackelid |
| 2012/0225210 A1 * | 9/2012 | Fruth ............... B29C 67/0077 427/294 |
| 2012/0266815 A1 | 10/2012 | Brunermer |
| 2013/0300286 A1 | 11/2013 | Ljungblad et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 * | 12/2014 | Holcomb ............... B22F 3/1017 419/53 |
| 2014/0367367 A1 | 12/2014 | Wood et al. |
| 2015/0004045 A1 | 1/2015 | Ljungblad |
| 2015/0086409 A1 | 3/2015 | Hellestam |
| 2015/0088295 A1 | 3/2015 | Hellestam |
| 2015/0139849 A1 * | 5/2015 | Pialot, Jr. ............... B22F 3/1055 419/55 |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |

FOREIGN PATENT DOCUMENTS

| | | |
|---|---|---|
| CN | 201693176 U | 1/2011 |
| DE | 19952998 A1 | 5/2001 |
| DE | 20305843 U1 | 7/2003 |
| DE | 102005014483 A1 | 10/2006 |
| DE | 202008005417 U1 | 8/2008 |
| DE | 102007018601 A1 | 10/2008 |
| DE | 10 2007 029052 A1 * | 1/2009 |
| DE | 102008012064 A1 | 9/2009 |
| EP | 0289116 A1 | 11/1988 |
| EP | 0322257 A2 | 6/1989 |
| EP | 0688262 A1 | 12/1995 |
| EP | 1418013 A1 | 5/2004 |
| EP | 1466718 A2 | 10/2004 |
| EP | 1683593 A2 | 7/2006 |
| EP | 1721725 A1 | 11/2006 |
| EP | 1952932 A2 | 8/2008 |

(56) References Cited

FOREIGN PATENT DOCUMENTS

| | | |
|---|---|---|
| EP | 2011631 A1 | 1/2009 |
| EP | 2119530 A1 | 11/2009 |
| EP | 2281677 A1 | 2/2011 |
| JP | 2003245981 | 9/2003 |
| SE | 524467 C2 | 8/2004 |
| WO | WO 93/08928 A1 | 5/1993 |
| WO | WO 96/12607 A1 | 5/1996 |
| WO | WO 97/37523 A2 | 10/1997 |
| WO | WO 01/81031 A1 | 11/2001 |
| WO | WO 01/85386 A2 | 11/2001 |
| WO | WO 02/08653 A1 | 1/2002 |
| WO | WO 2004/007124 A1 * | 1/2004 |
| WO | WO 2004/043680 A2 | 5/2004 |
| WO | WO 2004/054743 A1 | 7/2004 |
| WO | WO 2004/056511 A1 | 7/2004 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2011/008143 A1 | 1/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2013/178825 A2 * | 12/2013 |
| WO | WO 2014/071968 A1 | 5/2014 |
| WO | WO 2014/095200 A1 | 6/2014 |
| WO | WO 2014/095208 A1 | 6/2014 |

OTHER PUBLICATIONS

The Written Opinion of the International Search Authority mailed Mar. 8, 2016 for PCT/EP2014/067095; 7 pages.*
English translation of DE 10 2007 029052; Jan. 2009; 14 pages.*
Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4. XP002691483.
European Search Report dated Feb. 16, 2012, for corresponding Application No. EP07852089.7.
Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.
International Preliminary Examining Authority (IPEA), Second Written Opinion for International Application No. PCT/EP2012/076025, mailed Dec. 4, 2013, 4 pages European Patent Office, Germany.
International Preliminary Examining Authority, International Preliminary Report on Patentability for International Application No. PCT/EP2012/076025, including Applicant's Sep. 10, 2013 Response to the ISA's May 17, 2013 Written Opinion and Applicant's Jan. 14, 2014 Response to the IPEA's Second Written Opinion, mailed Apr. 4, 2014, 15 pages, European Patent Office, Germany.
International Preliminary Examing Authority, International Preliminary Report on Patentability for International Application No. PCT/EP2012/074383, including Applicant's Sep. 6, 2013 Reply to ISA's Feb. 27, 2013 Written Opinion, mailed Jan. 20, 2014, 16 pages, European Patent Office, The Netherlands.
International Preliminary Report on Patentability, dated Nov. 27, 2009, of corresponding international application No. PCT/SE2007/001084.
International Search Report dated Apr. 9, 2010 for Application No. PCT/SE2009/050901.
International Search Report dated Sep. 17, 2008 for Application No. PCT/SE2008/000007.
International Search Report mailed Sep. 2, 2008 of corresponding international application No. PCT/SE2007/001084.
International Searching Authority (ISA), International Search Report and Written Opinion for International Application No. PCT/EP2012/076025, mailed May 17, 2013, 11 pages, European Patent Office, The Netherlands.
International Searching Authority, International Search Report and Written Opinion for International Application No. PCT/EP2012/074383, mailed Feb. 27, 2013, 10 pages, European Patent Office, The Netherlands.
International Searching Authority, International Search Report for International Application No. PCT/SE2011/050093, mailed Oct. 20, 2011, 5 pages, The Swedish Patent and Registration Office, Sweden.
International Searching Authority, International Search Report for International Application No. PCT/EP2012/057470, mailed Jan. 24, 2013, 1 page, European Patent Office, The Netherlands.
Office Action dated Feb. 14,2012 for U.S. Appl. No. 12/745,081.
Office Action dated Nov. 8, 2011, U.S. Appl. No. 12/745,081.
United States Patent and Trademark Office, Final Office Action for U.S. Appl. No. 12/745,081, dated Jun. 21, 2012, 6 pages, USA.
United States Patent and Trademark Office, Notice of Allowance and Fee(s) Due for U.S. Appl. No. 13/144,451, mailed Sep. 25, 2012, 16 pages, USA.
United States Patent and Trademark Office, Office Action for U.S. Appl. No. 12/810,602, mailed Sep. 10, 2012, 13 pages, USA.
United States Patent and Trademark Office, Office Action for U.S. Appl. No. 12/810,602, Dec. 20, 2012, 8 pages, USA.
Weigel, TH., et al., "Design and Preparation of Polymeric Scaffolds for Tissue Engineering," Expert Rev. Med. Devices, 2006, pp. 835-851, vol. 3, No. 6, XP002691485.
Yang, et al., "The Design of Scaffolds for Use in Tissue Engineering, Part II, Rapid Prototyping Techniques", Tissue Engineering, 2002, pp. 1-11, vol. 8, No. 1, XP002691484.
International Searching Authority, International Search Report for International Application No. PCT/EP2012/058733, Mar. 5, 2013, 4 pages, European Patent Office, The Netherlands.

* cited by examiner

US 9,505,057 B2

POWDER DISTRIBUTION IN ADDITIVE MANUFACTURING OF THREE-DIMENSIONAL ARTICLES

CROSS-REFERENCE TO RELATED APPLICATIONS

This application claims priority to and the benefit of U.S. Provisional Patent Application Ser. No. 61/874,733, filed Sep. 6, 2013, the contents of which are hereby incorporated by reference in their entirety.

BACKGROUND

Technical Field

The present invention relates to a method for distributing powder in additive manufacturing of a three dimensional article.

Description of Related Art

Freeform fabrication or additive manufacturing is a method for forming three-dimensional articles through successive fusion of chosen parts of powder layers applied to a worktable.

An additive manufacturing apparatus may comprise a work table on which the three-dimensional article is to be formed, a powder dispenser or powder distributor, arranged to lay down a thin layer of powder on the work table for the formation of a powder bed, a high energy beam for delivering energy to the powder whereby fusion of the powder takes place, elements for control of the energy given off by the energy beam over the powder bed for the formation of a cross section of the three-dimensional article through fusion of parts of the powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

In additive manufacturing it is important to control the powder distribution. It is desirably to distribute a predefined amount of powder over a predetermined area. This requires a well-defined method and apparatus for repeatedly providing a predetermined thickness of powder on the work table. A not entirely insignificant problem is that the powder layer may now and then be provided with a non-homogenous thickness and/or not sufficient powder density. Such irregularities may affect the quality of the final three-dimensional article in the form of poor material properties, porosities, process instability, poor surface quality and/or dimensional changes and/or surface distortions.

BRIEF SUMMARY

An object of the invention is to provide a method which eliminates or at least reduces the above mentioned problem with powder layer irregularities. The above mentioned object is achieved by the features in the method according to the claims set forth herein.

In a first exemplary aspect of the invention it is provided a method for forming a three-dimensional article through successive fusion of parts of at least one powder layer provided on a work table in a build chamber, which parts correspond to successive cross sections of the three-dimensional article. The method comprising the steps of: providing at least a first powder tank and at least a second powder tank, providing a first type of powder in the first powder tank having a first particle size distribution, providing a second type of powder in the second powder tank having a second particle size distribution which is different to the first particle size distribution, wherein the smallest particle size in the second particle size distribution is smaller than the smallest particle size in the first particle size distribution, providing a first sub-layer of the first type of powder on the work table, providing a second sub-layer of the second type of powder on top of the first sub-layer of the first type of powder, where the first and second sub-layers are forming one of the at least one powder layers, and fusing the first and second sub-layers simultaneously with a high energy beam from a high energy beam source for forming a first cross section of the three-dimensional article.

The advantage of various embodiments of the present invention is that the density of powder for a single powder layer comprising at least a first and second sub layers is increased compared to if distributing the single powder layer in a single step. The small particles in the second powder size distribution may fill at least some of the cavities in the first sub-layer comprising of particles having a first particle size distribution. A higher density of powder for a single powder layer may result in a final three dimensional article having better material characteristics, finer tolerances and a better surface compared to if the powder layer would be distributed in a single step with a mixture of the first and second powder distributions.

In an example embodiment of the present invention the first particle size distribution is not overlapping in particle size with the second particle size distribution. An exemplary advantage of at least this embodiment is that all particles in the second particle size distribution is smaller than the smallest particle in the first particle size distribution, i.e., all particles in the second particle size distribution may be a candidate for filling cavities in the first sub layer.

In yet another example embodiment of the present invention the first particle size distribution is partially overlapping in particle size with the second particle size distribution. An exemplary advantage of at least this embodiment is that two sub layers may be provided given that the range in particle size distribution is very narrow. In still another embodiment of the present invention the smallest particles in the first particle size distribution is 3, 5 or 7 times as large as the largest particles in the second particle size distribution. The advantage of this embodiment is that the density of a single powder layer comprising a first and second sub layers may be increased for powder size distributions having a large disparity in powder size distributions.

In still another example embodiment of the present invention a first overflow container adapted for receiving the first type of powder and a second overflow container adapted for receiving the second type of powder is provided outside the build chamber. An exemplary advantage of at least this embodiment is that any overflow of a first type of powder may be collected in a different overflow container compared to any overflow of a second type of powder. This may simplify the reuse of powder.

In still another example embodiment of the present invention the first overflow container is provided to a first side of build chamber, the second overflow container is provided to second side of the build chamber, the first powder tank is provided to the second side of the build chamber and the second powder tank is provided to the first side of the build chamber, where the first and second sides are opposite to each other.

In yet another exemplary embodiment the first and second powder tanks are provided to a first side of the build chamber and where the a first overflow container is provided to a second side of build chamber, where the first and second sides are opposite to each other. An exemplary advantage of at least this embodiment is that the first and second powder tanks having the first and second type of powder respectively may not be so easily be mixed with each other. The first type of powder may be provided in the leftmost powder tank and the second type of powder may be provide in the powder tank in between the first powder tank and the build chamber. The first type of powder is having a particle size distribution which is larger than the second type of powder. When transferring a predetermined amount of the first type of powder over the second powder tank, the coarse powder from the first powder tank may not mix with the fine powder in the second powder tank. However, if the powder tanks would be reversed a mixture of powders may take place and the powder density at the build chamber may be decreased.

In still another example embodiment the work table is on the same position when applying the first and second sub-layers.

The position of the work table may not change when applying the second sub layer on top of the first sub layer. This means that the fine particles from the second type of powder may be forced into the first sub layer when the powder distributor is distributing the second type of powder over the first sub layer.

In another example embodiment of the present invention the work table is in a first position at a first distance from a top of the build chamber when applying the first sub layer and in a second position at a second distance from the top of the build chamber when applying the second sub layer, where the first distance is smaller than the second distance. In at least this embodiment the work table is lowered to a second position when the second sub layer is to be provided on top of the first sub layer. This will result in a thicker second sub layer compared to if the work table would have been in the same position during the application of the first and second sub layers.

In still another example embodiment of the present invention the work table is provided in a third position where a portion of a thickness of the powder layer is above the top of the build chamber, the portion of the thickness of the powder layer is removed before the fusion step. In at least this embodiment a portion of the thickness of the powder layer on the work table is removed before starting to fuse the powder layer. This may further increase the density of particles in the remaining powder layer.

In still another example embodiment of the present invention the third position of the work table is between the first and second position of the work table. This means that a portion of the thickness of the second sub layer is removed before starting to fuse the remaining powder layer. The remaining powder layer comprises an original thickness of the first sub layer and a thinner thickness than the first applied second sub layer. The removal of the portion of the thickness of the second sub layer on the work table may result in a densification of the particles in the remaining powder layer.

In still another example embodiment of the present invention the enclosable chamber is a vacuum chamber. The advantage of providing the manufacturing of the three dimensional article inside a vacuum chamber is the clean environment, i.e., no foreign particles that may affect the final particles.

In still another example embodiment of the present invention the high energy beam source is an electron beam or a laser beam.

In yet another example embodiment of the present invention a first powder distributor is provided for providing the first sub-layer and a second powder distributor is provided for providing the second sub-layer. Different powder distributors may have different shapes. A first particle size distribution may need a first powder distributor and a second particle size distribution may need a second powder distributor in order to apply the sub layer as compact as possible.

In still another example embodiment the first and second powder distributors are two physically separate powder distributors. In another example embodiment the first and second powder distributors are a single powder distributor being adapted to change geometry.

In still another example embodiment the removal of powder is performed with a different powder distributor compared to the powder distributor which is used for providing the first and/or the second sub-layer. In order to rake off a thin portion of the first powder layer a different powder distributor may be used compared to the powder distributor for applying the first and/or the second sub layers. The reason for this is that another shape and/or position of the powder distributor may be needed in order to maximize the compactness of the remaining powder layer.

In an example embodiment the powder distributor for removal of powder is a physically separate powder distributors compared to the first and second powder distributor. In this embodiment a separate powder distributor is used for raking off the thin powder layer from the first powder layer prior to fusing. In another embodiment the powder distributor for removal of powder is provided on the same powder distributor as the first and second powder distributor.

In another aspect of the invention it is provided a method for forming a three-dimensional article through successive fusion of parts of at least one layer of a powder bed provided on a work table in a build chamber, which parts corresponds to successive cross sections of the three-dimensional article. The method comprises the steps of providing at least a first powder tank, providing the work table in a first position at a first distance to the top of the build chamber, providing a first layer of powder on the work table having a first thickness, providing the work table in a second position at a second distance from the top of the build chamber, where the second distance is smaller than the first distance and where a portion of the first thickness of the powder layer is above the top of the build chamber, removing a portion of the first thickness of the layer of powder on the work table resulting in the first layer of powder having a second thickness, which second thickness is smaller than the first thickness, and fusing the first layer having the second thickness with a high energy beam from a high energy beam source for forming a first cross section of the three-dimensional article.

By first applying a too thick powder layer and then removing a portion of the thickness of the powder layer may increase the compactness of particles in the powder layer.

In another example embodiment of this invention it further comprising the steps of: providing a first type of powder in the first powder tank having a first particle size distribution, providing a second powder tank, providing a second type of powder in the second powder tank having a second particle size distribution which is different to the first particle size distribution, wherein the smallest particle size in the second particle size distribution is smaller than the smallest particle size in the first particle size distribution, providing a first sub-layer of the first type of powder on the work table providing a second sub-layer of the second type of powder on top of the first sub-layer, where the first and second sub-layers are forming the first layer of the powder bed, and fusing the first and second sub-layers simultaneously with a high energy beam, from a high energy beam source for forming a first cross section of the three-dimensional article.

In at least this embodiment the first powder layer comprising a first sub layer and a second sub layer which are applied on the work table in two different steps. The combination of applying different sub layers on top of each other and later on raking off a portion of the thickness of the first powder layer may improve the compactness of the particles in the powder layer.

In still another example embodiment the second sub layer is provided after having removed a portion of the thickness of the first sub layer on the work table. In at least this embodiment the first sub layer is first applied in a first thickness. In a subsequent step a portion of the thickness of the first sub layer is removed before the second sub layer is applied on top of the first sub layer. This may have the non-limiting advantage that the first sub layer may be as compact as possible before applying the second sub layer on top of the first sub layer.

In still another example embodiment a portion of the thickness of the second sub layer on the work table is removed before fusing the first and second sub layers simultaneously. In this embodiment a portion of the second sub layer is removed before fusing. This may be performed in addition to the removal of a portion to the thickness of the first sub layer.

In still another example embodiment of the present invention the first particle size distribution is not overlapping in particle size with the second particle size distribution. In another embodiment the first particle size distribution is partially overlapping in particle size with the second particle size distribution. In still another example embodiment the smallest particle in the first particle distribution is at least 3, 5 or 7 times as large as the largest particle in the second particle distribution. In yet another example embodiment the smallest particle size in the second particle size distribution is smaller than the smallest particle size in the first particle size distribution.

In still another example embodiment the method further comprising the step of: providing a first layer of powder on top of a previously fused cross section of the three-dimensional article prior to distributing the first and second sub-layers. An exemplary advantage of at least this embodiment is that any irregularities in the previously fused cross section may be even out before providing the first and second sub-layers which may result in a more evenly distributed first and second sub-layers which in turn may increase the dimension accuracy of the final three-dimensional article.

In an example embodiment the powder in the first layer is of the second type. An exemplary advantage of providing a first layer of powder of the second type is that the powder is a fine powder meaning that any small irregularity may be filled out with a relatively small first layer.

In still another example embodiment the powder in the first layer is sintered prior to distributing the first and second sub-layers. An exemplary advantage of at least this embodiment is that the flat surface is secured during the application of the first and second sub-layers.

In still another example embodiment the first layer is thinner than the sum of the first and second sub-layers. An exemplary advantage of at least this embodiment is that the flattening step, which the first layer may be considered to be, is just a fraction of the total cross sectional thickness, which means that another type of particle size distribution may be used in at least one of the first and second sub-layers for speeding up the manufacturing time. Another advantage is that a larger span of particle size distribution is used which means that the total powder cost may be decreased.

In still another example embodiment the first layer of powder is less than half the thickness of the sum of the first and second sub-layers. An exemplary advantage of at least this embodiment is that non-overlapping particle size distributions may be used for the first layer and for one of the first and second sub-layers.

BRIEF DESCRIPTION OF SEVERAL VIEWS OF THE DRAWINGS

Various embodiments of the invention will be further described in the following, in a non-limiting way with reference to the accompanying drawings. Same characters of reference are employed to indicate corresponding similar parts throughout the several figures of the drawings, wherein.

DETAILED DESCRIPTION OF VARIOUS EMBODIMENTS

To facilitate the understanding of various embodiments of the present invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 1:
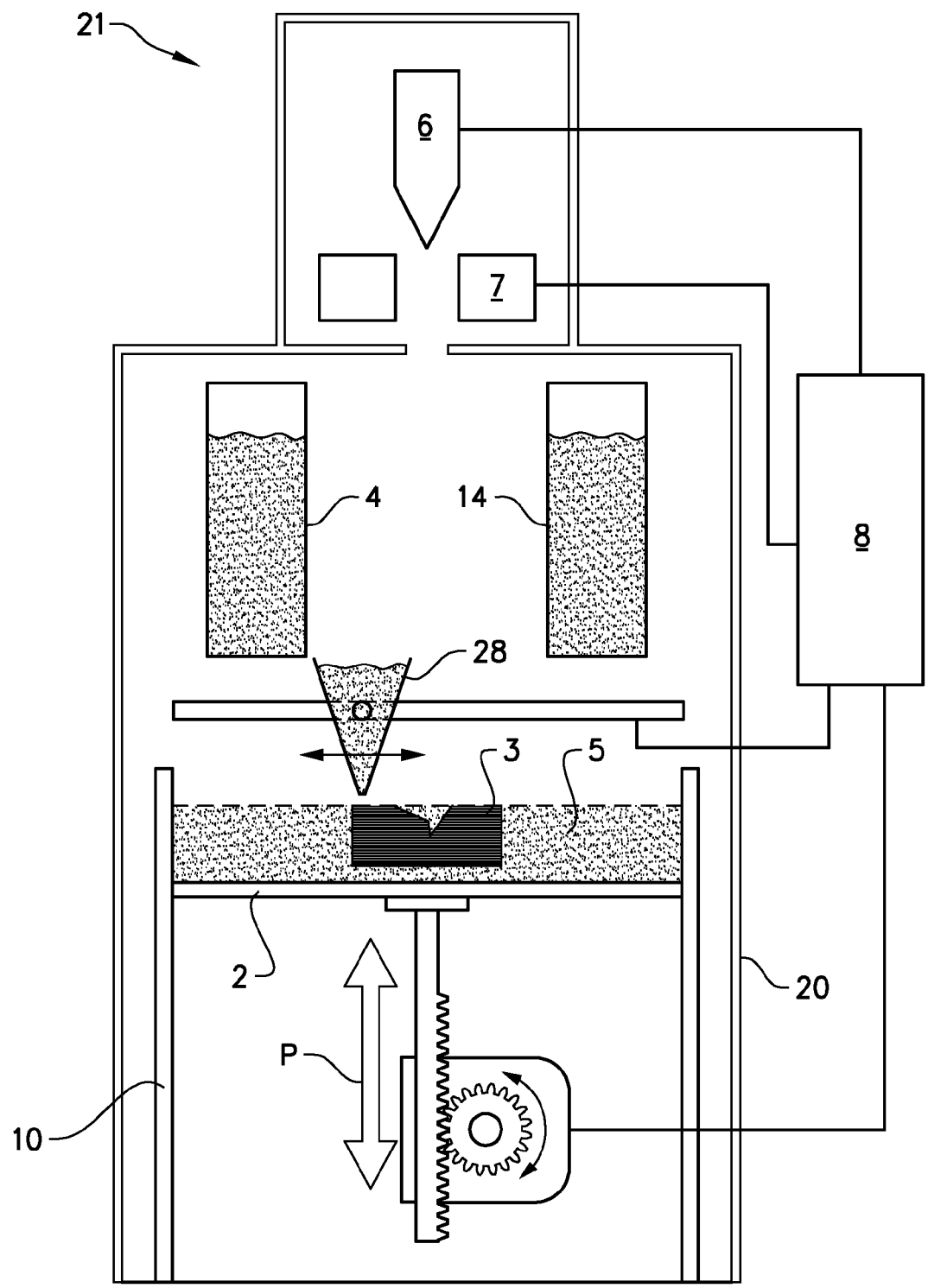
FIG. 1, shows, in a schematic view, an apparatus for producing a three dimensional product according to prior art.

FIG. 1 depicts an embodiment of a freeform fabrication or additive manufacturing apparatus 21 according to prior art.

The apparatus 21 comprises an electron beam gun 6; deflection coils 7; two powder hoppers 4, 14; a build platform 2; a build chamber 10; a powder distributor 28; a powder bed 5; and a vacuum chamber 20.

The vacuum chamber 20 is capable of maintaining a vacuum environment by means of a vacuum system, which system may comprise a turbomolecular pump, a scroll pump, an ion pump and one or more valves which are well known to a skilled person in the art and therefore need no further explanation in this context. The vacuum system is controlled by a control unit 8.

The electron beam gun 6 is generating an electron beam which is used for melting or fusing together powder material provided on the build platform 2. At least a portion of the electron beam gun 6 may be provided in the vacuum chamber 20. The control unit 8 may be used for controlling and managing the electron beam emitted from the electron beam gun 6. At least one focusing coil (not shown), at least one deflection coil 7, an optional coil for astigmatic correction (not shown) and an electron beam power supply (not shown) may be electrically connected to the control unit 8. In an example embodiment of the invention the electron beam gun 6 generates a focusable electron beam with an accelerating voltage of about 15-60 kV and with a beam power in the range of 3-10 Kw. The pressure in the vacuum chamber may be $10^{-3}$ mbar or lower when building the three-dimensional article by fusing the powder layer by layer with the energy beam.

In another embodiment a laser beam may be used for melting or fusing the powder material. In such case tiltable mirrors may be used in the beam path in order to deflect the laser beam to a predetermined position.

The powder hoppers 4, 14 comprise the powder material to be provided on the build platform 2 in the build chamber 10. The powder material may for instance be pure metals or metal alloys such as titanium, titanium alloys, aluminum, aluminum alloys, stainless steel, Co—Cr alloys, nickel based superalloys, etc., and the like.

The powder distributor 28 is arranged to lay down a thin layer of the powder material on the build platform 2. During a work cycle the build platform 2 will be lowered successively in relation to a fixed point in the vacuum chamber. In order to make this movement possible, the build platform 2 is in one embodiment of the invention arranged movably in vertical direction, i.e., in the direction indicated by arrow P. This means that the build platform 2 starts in an initial position, in which a first powder material layer of necessary thickness has been laid down. Means for lowering the build platform 2 may for instance be through a servo engine equipped with a gear, adjusting screws, etc., and the like An electron beam may be directed over the build platform 2 causing the first powder layer to fuse in selected locations to form a first cross section of the three-dimensional article. The beam is directed over the build platform 2 from instructions given by the control unit 8. In the control unit 8 instructions for how to control the electron beam for each layer of the three-dimensional article is stored.

After a first layer is finished, i.e., the fusion of powder material for making a first layer of the three-dimensional article, a second powder layer is provided on the build platform 2. The second powder layer is preferably distributed according to the same manner as the previous layer. However, there might be other methods in the same additive manufacturing machine for distributing powder onto the work table.

After having distributed the second powder layer on the build platform, the energy beam is directed over the work table causing the second powder layer to fuse in selected locations to form a second cross section of the three-dimensional article. Fused portions in the second layer may be bonded to fused portions of the first layer. The fused portions in the first and second layer may be melted together by melting not only the powder in the uppermost layer but also remelting at least a fraction of a thickness of a layer directly below the uppermost layer.

Figure 2A:
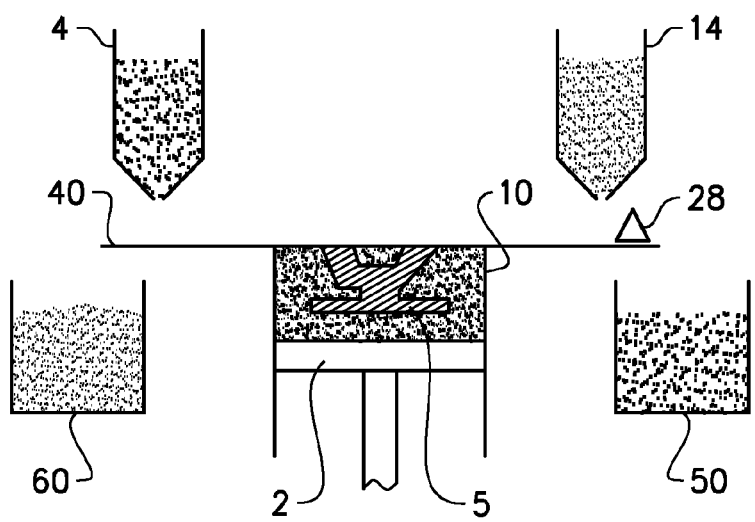
FIG. 2A depicts, in a schematic view, a first example embodiment of an apparatus for distributing different types of powder for forming a single powder layer.

FIG. 2A depicts schematically a first example embodiment of an apparatus for distributing different types of powder for forming a single powder layer.

The schematic embodiment in FIG. 2A comprises a first powder hopper 4, a second powder hopper 14, a powder distributor 28, a powder table 40, a build chamber 10, a build platform 2, an optional start plate 5, a first overflow container 50, and a second overflow container 60. The energy beam(s) and its energy beam source(s) and beam deflection mechanism for fusing the powder layers have been left out for clarity reasons only.

The first powder tank 4 may be provided with a first type of powder, e.g., a powder with a first particle size distribution. The second powder tank 14 may be provided with a second type of powder, e.g., a powder with a second particle size distribution. In certain embodiments, the first and second particle size distribution may have particle sizes overlapping with each other; in other embodiments the first and second particle size distributions may be non-overlapping with each other.

A predetermined amount of the first type of powder from the first powder tank 4 may be provided on the powder table between the powder distributor 28 and the build chamber 10. In another embodiment the predetermined amount of powder may be caught from a scree of powder from the first powder hopper. The powder distributor may be moved into the scree of powder on the powder table allowing for a predetermined amount of powder to fall over the powder distributor 28 from a first side facing the scree of powder of the first type to a second side facing the build chamber. A first sub-layer of a first type of powder may be formed by distributing the predetermined amount of the first type of powder over the start plate 5 (or build platform if the start plate may not be present) with the powder distributor.

A predetermined amount of the second type of powder from the second powder tank 14 may be provided on the powder table between the powder distributor 28 and the build chamber 10. In another embodiment the predetermined amount of powder of the second type may be caught from a scree of powder from the second powder hopper. The powder distributor 28 may be moved into the scree of powder on the powder table allowing for a predetermined amount of powder to fall over the powder distributor 28 from a first side facing the scree of powder of the second type of powder to a second side facing the build chamber 10. A second sub-layer of a second type of powder may be formed by distributing the predetermined amount of the second type of powder over the first sub-layer with the powder distributor.

Any overflow of the first type of powder may be received by the first overflow container 50, which may be provided to the right of the build chamber 10. The first powder tank 4 comprising the first type of powder may be provided to the left of and above the build chamber.

Any overflow of the second type of powder may be received by the second overflow container 60, which is provided to the left of the build chamber 10. The second powder tank 14 comprising the second type of powder may be provided to the right of and above the build chamber.

The first and second sub-layers may be forming a first powder layer. The first and second sub-layers may be fused simultaneously for forming a first cross section of the three dimensional article. A complete three-dimensional article is manufactured by repeating the distributing and fusing steps for all its cross sections.

Figure 2B:
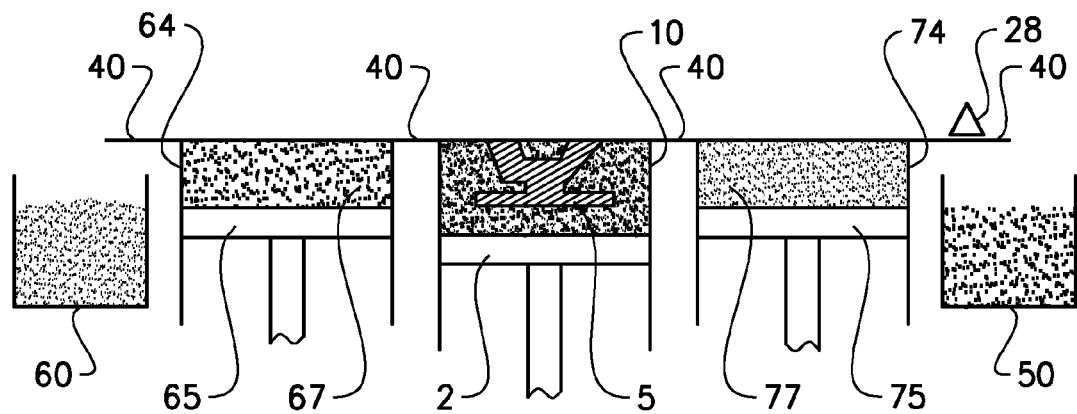
FIG. 2B depicts, in a schematic view, a second example embodiment of an apparatus for distributing different types of powder for forming a single powder layer.
Figure 3:
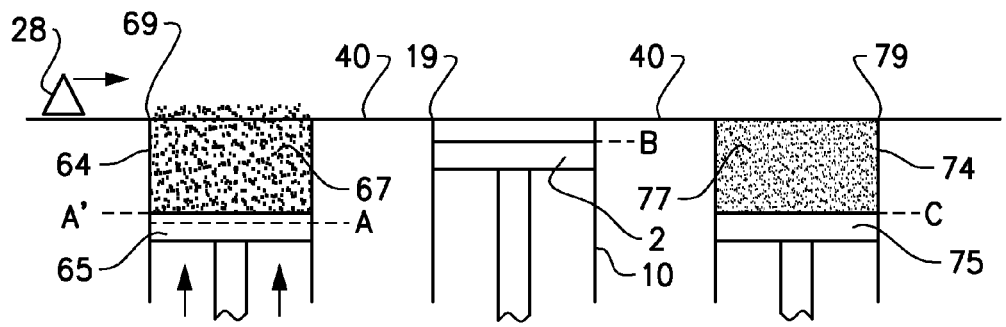
FIGS. 3-6 depict, in a schematic view, different steps in a first example embodiment of a method for powder application for the formation of a single layer of powder made up of at least two sub-layers of different powder characteristics.

FIG. 2B depicts schematically a second example embodiment of an apparatus for distributing different types of powder for forming a single powder layer.

The schematic embodiment in FIG. 2B comprises a first powder tank 64, a second powder tank 74, a powder distributor 28, a powder table 40, a build chamber 10, a build platform 2, a first overflow container 50, and a second overflow container 60. The energy beam(s) and its energy beam source(s) and beam deflection mechanism for fusing the powder layers have been left out for clarity reasons only.

The first powder tank 64 may be provided with a first type of powder, e.g., a powder with a first particle size distribution. The second powder tank 74 may be provided with a second type of powder, e.g., a powder with a second particle size distribution. The first and second particle size distribution may have particle sizes overlapping with each other; in other embodiments the first and second particle size distributions may be non-overlapping with each other.

A predetermined amount of the first type of powder from the first powder tank 64 may be provided on the powder table 40 between the powder distributor 28 and the build chamber 10. This predetermined amount of powder is provided on the powder table 40 by raising a floor 65 in the powder tank 64 a predetermined distance. By doing so, a predetermined thickness of the powder 67 in the powder tank 64 may be raked off by the powder distributor 28 from the powder tank 64 to a powder table 40 between the powder tank 64 and the build chamber 10 or directly to the build chamber 10 if there is no space between the build chamber 10 and the first powder tank 64.

A first sub-layer of the powder 67 of a first type may be formed by distributing the powder over the build platform 65 with the powder distributor 28.

A predetermined amount of the second type of powder 77 from the second powder tank 74 may be provided on the powder table 40 between the powder distributor 28 and the build chamber 10. This predetermined amount of powder is provided on the powder table 40 by raising a floor 75 in the second powder tank 74 a predetermined distance. By doing so, a predetermined thickness of the powder 77 in the second powder tank 74 may be raked off by the powder distributor 28 from the second powder tank 74 to a powder table 40 between the second powder tank 74 and the build chamber 10 or directly to the build chamber 10 if there is no space between the build chamber 10 and the second powder tank 74.

A second sub-layer of the powder 67 of a second type may be formed by distributing the powder over the first sub layer of powder of the first type with the powder distributor 28. The first sub-layer and the second sub-layer may be forming a first powder layer.

Any overflow of the first type of powder 67 may be received by the first overflow container 50, which may be provided to the right of the build chamber 10 and to the right of the second powder tank 74. The first powder tank 64 comprising the first type of powder may be provided to the left of the build chamber 10.

Any overflow of the second type of powder 77 may be received by the second overflow container 60, which is provided to the left of the build chamber 10 and to the left of the first powder tank 64.

The first and second sub-layers may be forming a first powder layer. The first and second sub-layers may be fused simultaneously for forming a first cross section of the three dimensional article. A complete three-dimensional article may be manufactured by repeating the distributing and fusing steps for all its cross sections.

FIG. 12A-12F depict in a schematic view an example embodiment of different steps in a method for forming a three-dimensional article through successive fusion of parts of at least one powder layer provided on a work table 2 in the build chamber 10, which parts correspond to successive cross sections of the three-dimensional article. In this example embodiment a first layer 90 of powder material is provided on the work table 2. The first layer 90 is sintered or melted before providing a second layer 92 on top of the first layer 90. The first and second layer are regarded as a unit and represent a cross section of the three dimensional article. The function of the first layer is to even out any irregularities on the top surface of the previous melted layer (cross section). When the second layer is provided on top of the first layer, a flatness of the first layer may have been improved compared to the flatness of the top surface of the previous layer. The particle size distribution may be chosen so as to efficiently even out the irregularities. In an example embodiment the thickness of the first layer 90 of powder material may be less than half the thickness of the second layer 92 of powder material.

More specifically in an example embodiment the method may comprise the steps of: providing at least a first powder tank 64 and at least at least a second powder tank 74. In FIG. 12A-12F the first powder tank 64 may be provided to the left of the build chamber 10 and the second powder tank 74 may be provided to the right of the build chamber 10; providing a first type of powder 67 in the first powder tank 64 having a first particle size distribution. In FIG. 12A-12F the first powder tank 64 to the left of the build chamber 10 comprises the first type of powder 67. The first type of powder 67 may be a coarsely powder, meaning that the mean particle size is larger in comparison with the mean particle size of a second type of powder 77; and providing the second type of powder 77 in the second powder tank 74 having a second particle size distribution, which is different to the first particle size distribution. In FIG. 12A-12F the second powder tank 74 to the right of the build chamber 10 comprises the second type of powder 77.

The second type of powder 77 may be a fine powder meaning that the mean particle size is smaller than the mean particle size of the first type of powder (coarse powder). In an example embodiment the first type of powder 67 (coarse powder) may have a particle size distribution being 50-100 μm and the second type of powder 77 (fine powder) may have a particle size distribution being 25-45 μm.

Figure 12A:
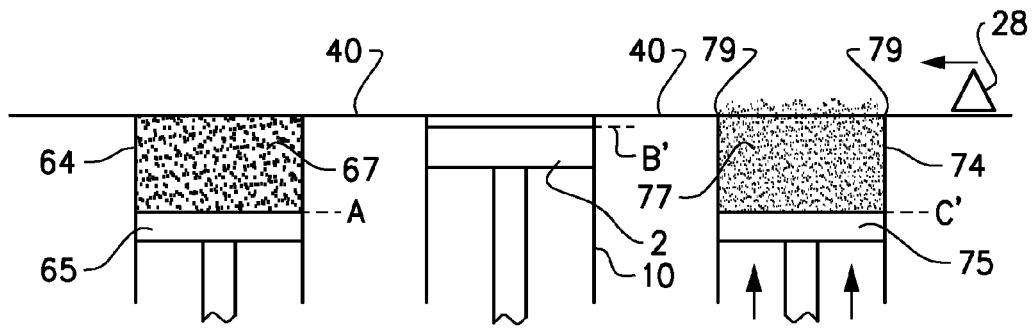
FIGS. 12A-12F depict, in a schematic view, different steps in a third example embodiment according of a method to the present invention for powder application for formation of a single layer of powder.

Remaining with the example embodiment the method may further comprise the step of providing a first layer 90 of powder material on top of a bare work table 2 or on a top surface of a previously fused powder layer. In FIG. 12A the second type of powder 77 from the second powder tank is provided on top of the work table 2 in the following way. A height-adjustable platform 75 in the second powder tank 74 is raised a predetermined amount upwards, indicated by the arrows under the platform 75, so that a top surface of the platform 75 is at a position denoted by C'. By raising the platform 75 a predetermined amount, a predetermined amount of powder inside the second powder tank 74 will be lifted above a top position 79 of the second powder tank 74. The powder distributor 28 is adapted to rake off the predetermined amount of powder from the second powder tank 74 and apply it on a height-adjustable work table 2 in the build chamber 10.

Figure 12B:
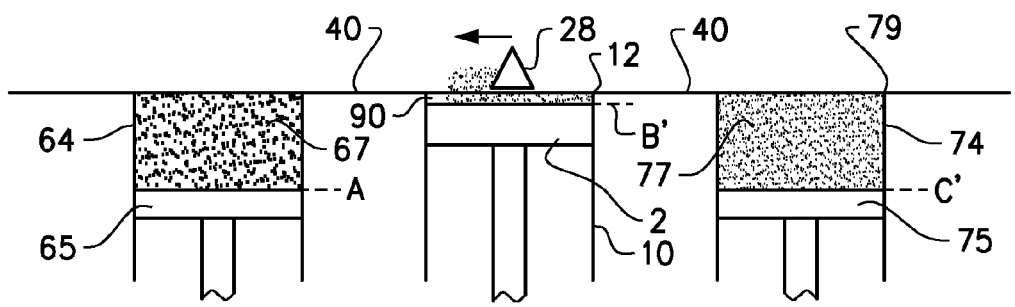
Figure 12C:
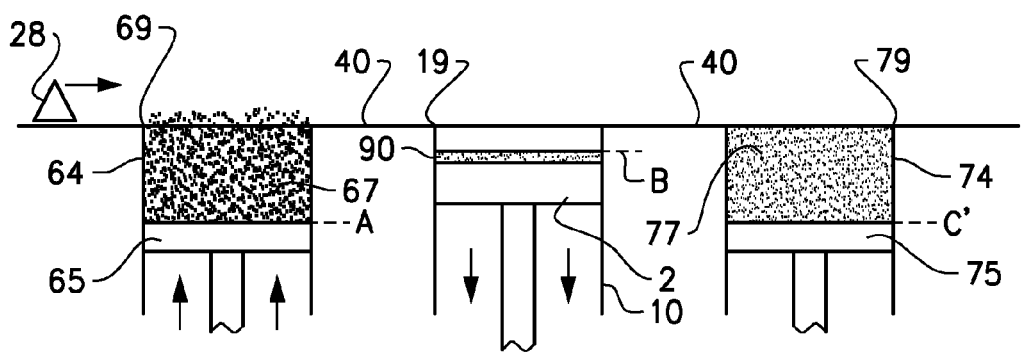

In the exemplary method and as illustrated in FIG. 12B, the powder distributor 28 may apply the first layer 90 of powder material on top of the height-adjustable work table 2. The thickness of the first layer 90 is equal to the distance between the top surface of said height-adjustable work table 2 and a top position 12 of the build chamber 10. The first layer 90 may be sintered or melted before applying a first sub-layer and a second sub-layer of powder material. The first layer and the first and second sub-layers are regarded as one layer, i.e., one cross section of the three-dimensional article. The first layer are provided for even out any irregularities on the previous layer's top surface.

Figure 12D:
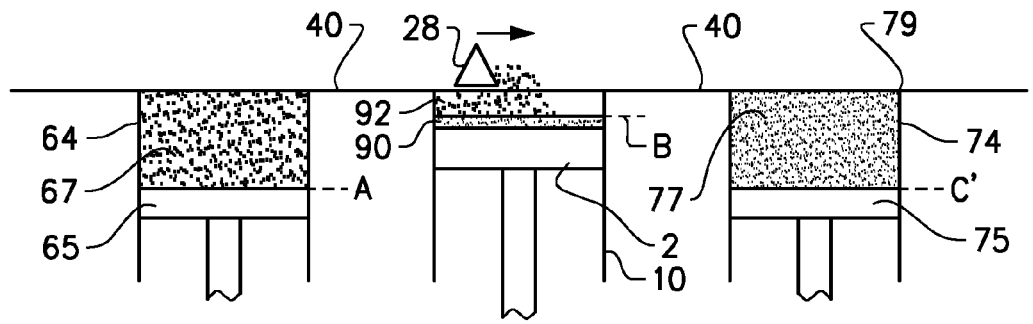

Remaining with the example embodiment the method may further comprise the step of providing a first sub-layer of the first type of powder on a top surface of the first layer 90. Any powder layer to be fused by the energy beam, for forming the three dimensional article, may in this embodiment comprise at least two sub-layers and the first layer 90. At least two of the sub-layers for forming a powder layer may have different powder characteristics such as particle size distribution. The first sub-layer may be provided by first raising the height adjustable platform 65 in the first powder tank 64 from a first position denoted by A in FIG. 12C to a second position denoted by A' in FIG. 12C. By doing so a predetermined amount of the powder in the first powder tank 64 may be lifted above a top position 69 of the powder tank 64. The predetermined amount of powder may be transferred from the powder tank 64 to the build chamber 10 by means of the powder distributor 28. A work table 2 is set in a position denoted by B in FIG. 12C. The thickness of the powder layer representing the cross section of the three dimensional article is the sum of the thickness of the first layer 90 and the thickness of the first and second sub-layers 92, i.e., in FIG. 12 the distance from the top position 19 of the build chamber and a top surface of the height adjustable work table 2. In FIG. 12D it is depicted when the powder distributor is distributing the first type of powder from the first powder tank 64 over the top surface of the first layer 90 in the build chamber 10. Any overflow material when having passed the rightmost end of the build chamber 10 when distributing the first type of powder from the first powder tank may be collected by a first overflow container (not shown in FIG. 12C or 12D).

Figure 12E:
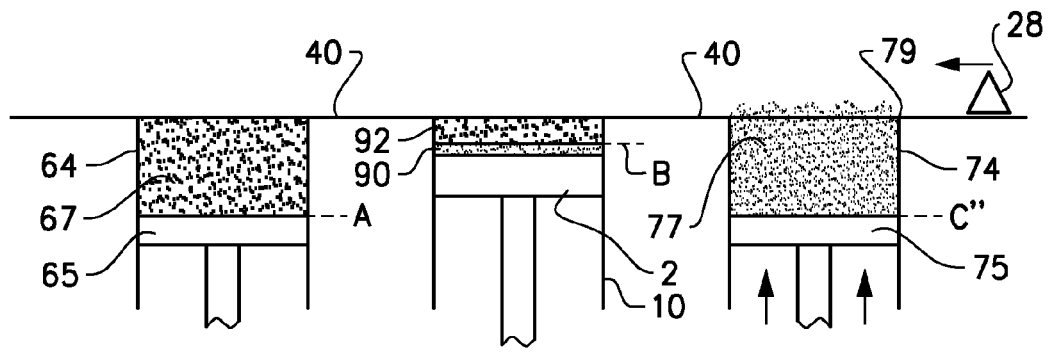
Figure 12F:
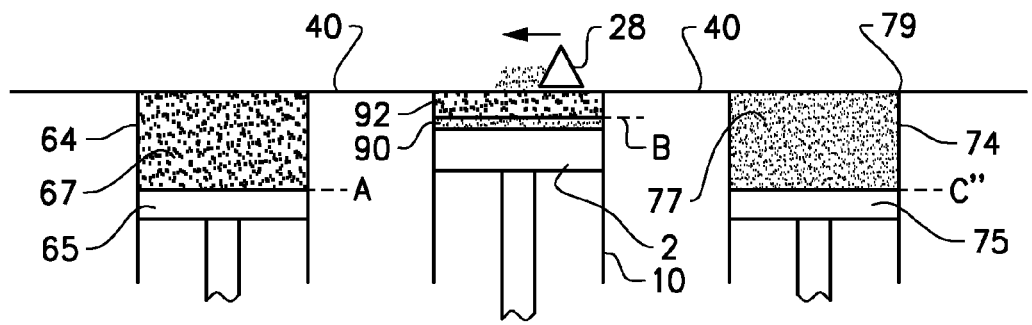

Remaining with the example embodiment the method may further comprise the step of providing a second sub-layer of the second type of powder on top of the first sub-layer of the first type of powder. In FIG. 12E the second sub-layer may be provided by first raising the height adjustable platform 75 in the second powder tank 74 to a second position denoted by C" in FIGS. 12E and 12F. By doing so a predetermined amount of the powder in the second powder tank 74 may be lifted above a top position 79 of the powder tank 74. The predetermined amount may be transferred from the second powder tank 74 to the build chamber 10 by means of the powder distributor 28. A work table 2 may be set in a position denoted by B, i.e., the same position as when the first sub-layer was distributed over the top surface of the first layer 90. In FIG. 12F it is depicted when the powder distributor is distributing the second type of powder from the second powder tank 74 over the first sub-layer in the build chamber 10. Any overflow material when having passed the leftmost end of the build chamber 10 when distributing the second type of powder from the second powder tank 74 may be collected by a first overflow container (not shown in FIG. 12E or 12F).

Remaining with the example embodiment the method may further comprise the step of fusing the first layer 90 and the first and second sub-layers simultaneously with a high energy beam from a high energy beam source for forming a first cross section of the three-dimensional article. The first layer 90 and the first and second sub-layers 92, which are forming the first powder layer, are fused for forming the first cross section of the three-dimensional article. Any underlying already fused cross section of the three-dimensional article may also at least partially be refused resulting in a bonding of the fused powder layer representing cross section number N of the three dimensional article with the already fused cross section having a number N−1, where N is an integer number being larger than 2.

FIGS. 3-6 depict in a schematic view, another example embodiment of different steps in a method for forming a three-dimensional article through successive fusion of parts of at least one powder layer provided on a work table 2 in the build chamber 10, which parts correspond to successive cross sections of the three-dimensional article.

More specifically in an example embodiment the method may comprise the step of providing at least a first powder tank 64 and at least at least a second powder tank 74. In FIG. 3-6 the first powder tank 64 may be provided to the left of the build chamber 10 and the second powder tank 74 may be provided to the right of the build chamber 10. Providing a first type of powder 67 in the first powder tank 64 having a first particle size distribution. In FIG. 3-6 the first powder tank 64 to the left of the build chamber 10 comprises the first type of powder 67. The first type of powder 67 may be a coarsely powder, meaning that the mean particle size is larger in comparison with the mean particle size of a second type of powder 77.

Remaining with the example embodiment the method may further comprise the step of providing the second type of powder 77 in the second powder tank 74 having a second particle size distribution, which is different to the first particle size distribution. In FIG. 3-6 the second powder tank 74 to the right of the build chamber 10 comprises the second type of powder 77. The second type of powder 77 may be a fine powder meaning that the mean particle size is smaller than the mean particle size of the first type of powder (coarse powder). In an example embodiment the first type of powder 67 (coarse powder) may have a particle size distribution being 50-100 μm and the second type of powder 77 (fine powder) may have a particle size distribution being 25-45 μm. Providing a first sub-layer of the first type of powder on the work table.

Figure 4:
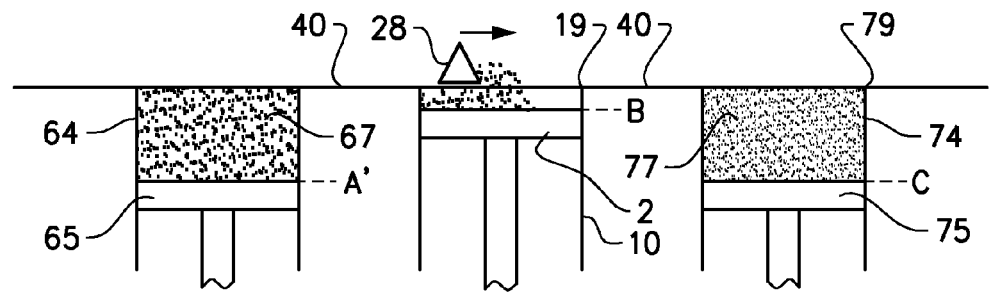

Any powder layer to be fused by the energy beam, for forming the three dimensional article, may in this embodiment comprise at least two sub-layers. At least two of the sub-layers for forming a powder layer may have different powder characteristics such as particle size distribution. The first sub-layer may be provided by first raising the height adjustable platform 65 in the first powder tank 64 from a first position denoted by A in FIG. 3 to a second position denoted by A' in FIG. 3. By doing so a predetermined amount of the powder in the first powder tank 64 may be lifted above a top position 69 of the powder tank 64. The predetermined amount of powder may be transferred from the powder tank 64 to the build chamber 10 by means of the powder distributor 28. A work table 2 is set in a position denoted by B in FIG. 3. The thickness of the powder layer representing the cross section of the three dimensional article is the sum of the thickness of the first and second sub-layers 92, i.e., the distance from the top position 19 of the build chamber and a top surface of the height adjustable work table 2. In FIG. 4 it is depicted when the powder distributor is distributing the first type of powder from the first powder tank 64 over the work table 2 in the build chamber 10. Any overflow material when having passed the rightmost end of the build chamber 10 when distributing the first type of powder 67 from the first powder tank 64 may be collected by a first overflow container (not shown in FIG. 3 or 4).

Figure 5:
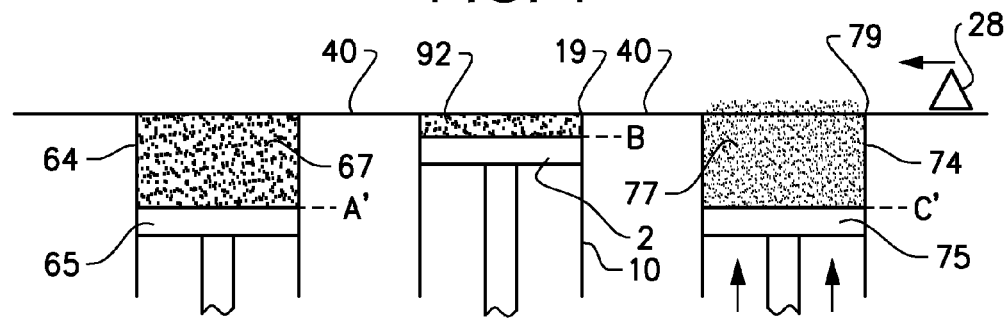
Figure 6:
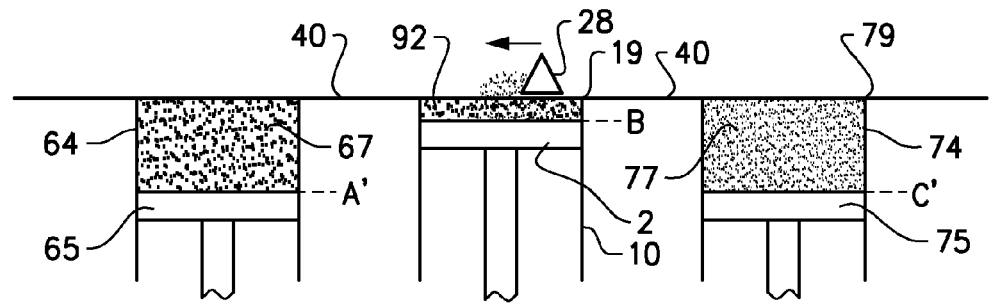

Remaining with the example embodiment the method may further comprise the step of providing a second sub-layer of the second type of powder on top of the first sub-layer of the first type of powder. In FIG. 5 the second sub-layer may be provided by first raising the height adjustable platform 75 in the second powder tank 74 to a second position denoted by C' in FIGS. 5 and 6. By doing so a predetermined amount of the powder in the second powder tank 74 may be lifted above a top position 79 of the powder tank 74. The predetermined amount may be transferred from the second powder tank 74 to the build chamber 10 by means of the powder distributor 28. A work table 2 may be set in a position denoted by B, i.e., the same position as when the first sub-layer was distributed over the work table on FIG. 4. In FIG. 6 it is depicted when the powder distributor is distributing the second type of powder from the second powder tank 74 over the first sub-layer in the build chamber 10. Any overflow material when having passed the leftmost end of the build chamber 10 when distributing the second type of powder from the second powder tank 74 may be collected by a first overflow container (not shown in FIG. 3 or 4).

Remaining with the example embodiment the method may further comprise the step of fusing the first and second sub-layers simultaneously with a high energy beam from a high energy beam source for forming a first cross section of the three-dimensional article. The first and second sub-layers which are forming the first powder layer are fused for forming the first cross section of the three-dimensional article. Any underlying already fused cross section of the three-dimensional article may also at least partially be refused resulting in a bonding of the fused powder layer representing cross section number N of the three dimensional article with the already fused cross section having a number N−1, where N is an integer number being larger than 2.

Figure 7:
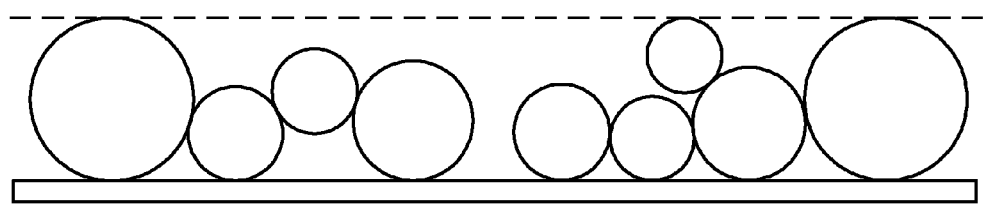
FIG. 7 depicts, in a schematic view, a first sub-layer of a first powder layer having a first powder characteristics.

FIG. 7, depicts, in a schematic view, a first sub-layer of a first powder layer having a first powder characteristics. The first powder characteristics may for instance be a first particle size distribution. The first sub-layer may use a particle size distribution having larger particle sizes than the second sub-layer. The first sub-layer may have a particle size distribution being 50-100 μm. The particle sizes may be distributed according to a normal distribution curve. The first sub-layer may not be thinner than the largest particles of the first type, i.e., in the case given above where the particle size distribution is 50-100 μm, the first sub-layer may not be thinner than 100 μm.

Figure 8:
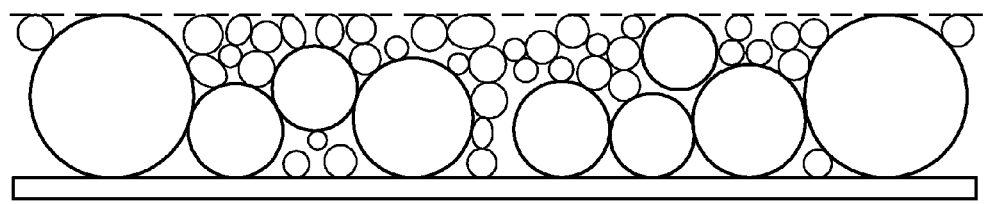
FIG. 8 depicts, in a schematic view, a first and a second sub-layers forming a first powder layer, where the first and second sub-layers having different particle size distributions.

FIG. 8 depicts, in a schematic view, a first and a second sub-layers forming a first powder layer, where the first and second sub-layers having different particle size distributions. In FIG. 8 a second sub-layer has been provided on top of the first sub-layer. The second sub-layer may have a particle size distribution which is different to the first sub-layer. In an example embodiment the second sub-layer is having a particle size distribution which is smaller than the first sub-layer. An example embodiment of particle size distribution may be 20-45 μm, which will result in a second particle size-distribution of the second sub-layer which is not overlapping in particle sizes with the first particle size distribution of the first sub-layer. In another embodiment the second particle size distribution may be 25-55 μm, i.e., being slightly overlapping in particle sizes with the first particle size distribution.

In still another example embodiment the first particle size distribution may be 70-100 μm and the second particle size distribution may be 20-40 μm. In yet another example embodiment the first particle size distribution may be 80-110 μm and the second particle size distribution may be 20-30 μm. In still another example embodiment the first particle size distribution may be 90-150 μm and the second particle size distribution may be 25-30 μm.

In still another example embodiment the smallest particle in the first particle distribution is at least 3 times as large as the largest particle in the second particle distribution.

In still another example embodiment the smallest particle in the first particle distribution is at least 5 times as large as the largest particle in the second particle distribution.

In still another example embodiment the smallest particle in the first particle distribution is at least 7 times as large as the largest particle in the second particle distribution.

The small particles of the second sub-layer, in comparison with the larger particles in the first sub-layer, will fall into empty spaces in the first sub-layer, i.e., creating a relatively compact first powder layer which is made up of the first and second sub-layers. The work table 2 may in a first example embodiment be in the same position when applying the first sub-layer and the second sub-layer, i.e., the thickness of the final first powder layer is already set by the position of the work table 2 when applying the first sub-layer and fixed in that position until second sub-layer is provided on top of the first sub-layer.

In another embodiment the work table 2 is in a first position when applying the first sub-layer and in a second position when applying the second sub-layer, where the first position is higher than the second position.

FIGS. 7 and 8 depicts an example embodiment where only two sub-layers are used for forming the first powder layer. It is evident that any number of sub-layers may be used for forming a first powder layer being larger than N, where N≥2.

The particle sizes of the second sub-layer may be distributed according to a normal distribution curve.

Figure 9:
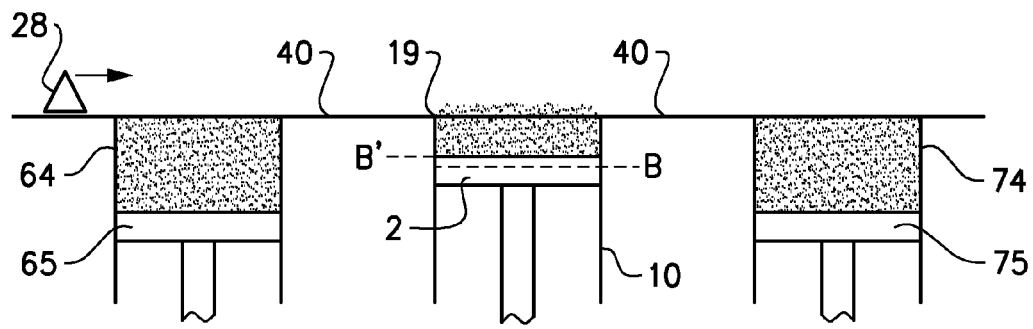
FIGS. 9 and 10 depict, in a schematic view, two steps in a second example embodiment of a method for powder application for the formation of a single layer of powder.
Figure 10:
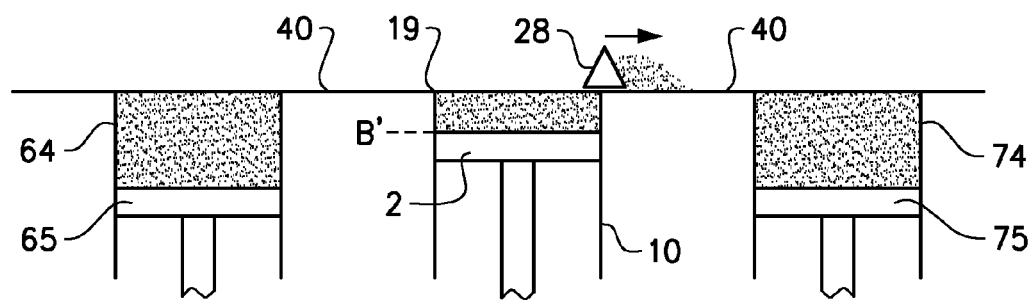

FIG. 9-10, depict, in a schematic view, another example embodiment of a method for powder application for the formation of a single layer of powder.

A first powder layer on the work table 2 in the build chamber 10 is in a first step formed with a too large thickness, i.e., the desired thickness of the first powder layer is thinner than the factual thickness of the first powder layer. For this reason a predetermined amount of powder needs to be removed from the existing first powder layer for matching the desired thickness with the factual thickness.

In FIG. 9 a too thick first powder layer is denoted by a first position B of the work table 2. A desired thickness of the first powder layer is denoted by a second position B' of the work table 2, where the second position B' is closer to the top position 19 of the build chamber 10 than the first position B.

When raising the work table from the position denoted by B to the position denoted by B', a predetermined amount of powder is raised above the top position 19 of the build chamber 10. In FIG. 10, the predetermined amount of powder which has been raised above the top position 19 of the build chamber 10 has been raked off by the powder distributor 28, leaving a first powder layer on the work table 2 corresponding to the desired thickness. The effect of first providing a too thick powder layer and thereafter scraping off a predetermined thickness is that the resulting first powder layer may be more compact compared to if the first powder layer has been provided by transferring powder from a powder tank and distribute the powder on top of the work table. This may be explained by a continuous surplus of powder when scraping of a predetermined thickness. Another design of the powder distributor may also be used when scraping of a predetermined layer thickness compared to when transporting powder from a powder tank to the work table. Another powder distributor, i.e., a second physically separated powder distributor may be used for scraping of the predetermined thickness of powder from the first powder layer. In another embodiment a single powder distributor may be used, which may be rotated or tilted or physically change its shape when scraping off the powder layer in the build chamber 10 compared to when the same powder distributor is used for transporting powder form the powder tank 64, 74 to the work table 2.

The first powder layer may be composed of a single type of powder. In FIGS. 9 and 10 the same type of powder may then be provided in the first powder tank 64 and the second powder tank 74. When scraping of the surplus layer the surplus powder may be collected by one of the powder tanks, i.e., there may not be any separate overflow container. In another embodiment one or two separate overflow containers may be used for collecting the surplus powder which is scraped off the build chamber 10.

In another embodiment the first powder layer may be composed of at least two types of powder. A first powder may for instance have a first powder size distribution and a second type may have a second particle size distribution in correspondence with what is disclosed in relation to FIGS. 2-8.

The first powder layer is applied too thick in relation to the desired thickness, i.e., a predetermined amount of powder has to be removed from the first powder layer in order to arrive at the desired thickness. In a first example embodiment the second sub-layer has a thickness which is thicker than the thickness which has to be removed in order to arrive at the desired thickness of the first powder layer. In an example embodiment the second sub-layer is twice as thick as the thickness which has to be removed. In still another example embodiment the second sub-layer is composed of a particle size distribution being 20-45 µm and having a thickness of 90 µm before a thickness of 45 µm is removed from the top of the first powder layer, i.e., the second sub-layer. In yet another example embodiment the second sub-layer is first applied at a thickness being at least twice as thick as the largest powder particle in its particle size distribution. A predetermined thickness of the second sub-layer may then be removed which is at least as large as the largest particle in the second particle size distribution.

The powder which is raked from the powder tank 64, 74 to the build chamber 10 is distributed evenly on top of the work table 2 inside the build chamber 10. The evenly distribution may be performed with the powder rake 28, but may also be performed with another distribution device such as another rake or a vibration or oscillation mechanism.

A first layer of the three-dimensional article may be formed by fusing the layer of powder provided on the work table in predetermined locations.

The work table may be lowered a predetermined distance in order to allow a further layer of powder material to be provided on the already applied powder layers on the work table. The steps of raking new powder material from the powder hopper to the build chamber, distribution of the powder on the work table, fusing of the powder layers on predetermined location and lowering of the work table is repeated until the three dimensional article is finalized.

Figure 11:
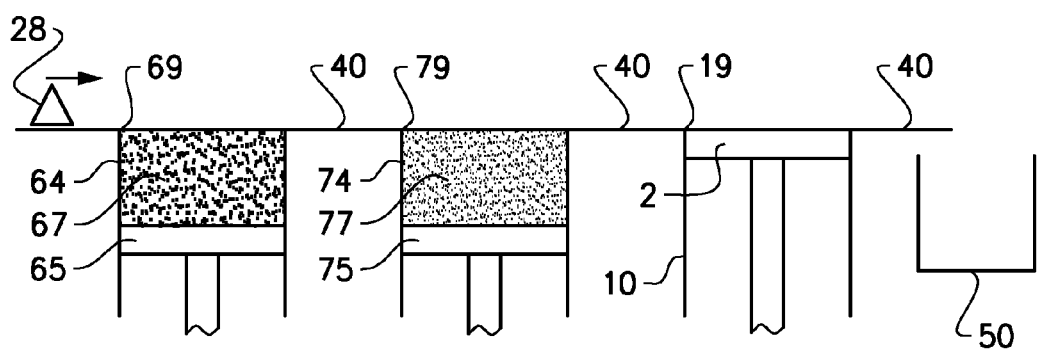
FIG. 11 depicts, in a schematic view, a third example embodiment of an apparatus for distributing different types of powder for forming a single powder layer.

FIG. 11, depicts, in a schematic view, a third example embodiment of an apparatus for distributing different types of powder for forming a single powder layer.

The schematic embodiment in FIG. 11 comprises a first powder hopper 64, a second powder hopper 74, a powder distributor 28, a powder table 40, a build chamber 10, a build platform 2, an overflow container 50. The energy beam(s) and its energy beam source(s) and beam deflection mechanism for fusing the powder layers have been left out for clarity reasons only.

The first powder tank 64 may be provided with a first type of powder 67, e.g., a powder with a first particle size distribution. The second powder tank 74 may be provided with a second type of powder 77, e.g., a powder with a second particle size distribution. The first and second particle size distributions may have particle sizes overlapping with each other; in another embodiment, though, the first and second particle size distributions may be non-overlapping with each other.

A first sub-layer of a first type of powder 67 may be formed by distributing a predetermined amount of the first type of powder 67 over the work table 2 with the powder distributor 28. The predetermined amount of powder is generated by increasing the height of a floor 65 in the first powder tank 64. The powder distributor 28 may rake off the predetermined amount of powder which is lifted over a top position 69 of the first powder tank 64, from the powder tank to the build chamber 10.

A second sub-layer of a second type of powder 77 may be formed by distributing the predetermined amount of the second type of powder 77 over the first sub-layer with the powder distributor 28. The predetermined amount of powder is generated by increasing the height of a floor 75 in the second powder tank 74. The powder distributor 28 may rake off the predetermined amount of powder which is lifted over a top position 79 of the second powder tank 74, from the powder tank to the build chamber 10.

The first type of powder 67 may have a larger particle size distribution than the second type of powder 77. The second type of powder 67 is, in FIG. 11, transported over the second type of powder 77 in the second powder tank 74 before being distributed over the work table 2 in the build chamber 10.

Any overflow of the first and/or second type of powder 67, 77 may be collected by the overflow container 50. After the build of the three dimensional article is finished the overflow of powder in the overflow container 50 may be separated into a first type of powder with a first powder distribution and a second type of powder with a second powder distribution.

In FIG. 11 the first powder tank 64 and the second powder tank 74 is provided at one side of the build container 10. In the illustrated example embodiment in FIG. 11 the first and second powder tanks are arranged to the left of the build chamber 10. In another embodiment the first powder tank 64 and the second powder tank 74 may be arranged to the right of the build chamber 10. The overflow container may be arranged on an opposite side to the build chamber 10 in relation to the first and second powder tanks, i.e., if the first and second powder tanks are provided to the left of the build chamber as in FIG. 11, the overflow container is provide to the right of the build chamber 10. The reverse is also possible, i.e., the powder tanks, first and second 64, 74 to the right and the overflow container 50 to the left of the build chamber 10.

The first and second sub-layers may be forming a first powder layer. The first and second sub-layers may be fused simultaneously for forming a first cross section of the three dimensional article. A complete three-dimensional article is manufactured by repeating the distributing and fusing steps for all its cross sections. The thickness of the first powder layer may be determined by the distance of a top surface of the work plate (or a top surface of a previously partially fused cross section of the three dimensional article) to the top 19 of the build container 10.

In an example embodiment of the present invention it is provided a method for forming a three-dimensional article through successive fusion of parts of at least one powder layer provided on a work table in a build chamber, which parts correspond to successive cross sections of the three-dimensional article. The method may comprise the steps of providing at least a first powder tank and at least a second powder tank, providing a first type of powder in the first powder tank having a first particle size distribution, providing a second type of powder in the second powder tank having a second particle size distribution which is different to the first particle size distribution, where the smallest particle size in the second particle size distribution is smaller than the smallest particle size in the first particle size distribution; providing a first layer of powder of the second type on top of a previously fused cross section of the three-dimensional article, sintering the first layer of powder, providing a second layer of the first type of powder on top of the sintered second type of powder, and fusing the first and second layer simultaneously for forming a cross section of the three-dimensional article.

The first layer is provided for even out any irregularities in the previous melted cross section. The second type of powder is provided in a relatively thin layer compared to the second layer. The cross section is built up from the sum of the first and second layer. The first layer may have a relatively small particle size distribution for efficiently filling out any irregularities with a thin first layer. In an example embodiment the first layer is thinner than the second layer. In another example embodiment the first layer is less than half the thickness of the second layer. In still another example embodiment the first layer is less than ⅓ of the thickness of the second layer.

The sintered powder is not melted but heated so as to attach the powder particles together. The sintered particles are so loosely bonded to each other so they can be released from each other by means of vibrations and/or blasting technique.

It should be understood that the present invention is not limited to the above-described embodiments and many modifications are possible within the scope of the following claims. Such modifications may, for example, involve using a different source of energy beam than the exemplified electron beam such as a laser beam. Additionally or otherwise, materials other than metallic powder may be used, such as the non-limiting examples of powder of polymers or powder of ceramics.

That which is claimed:

1. A method for forming a three-dimensional article through successive fusion of parts of at least one powder layer provided on a work table in a build chamber, which parts correspond to successive cross sections of the three-dimensional article, said method comprising the steps of:
    providing at least a first powder tank and at least a second powder tank;
    providing a first type of powder in said first powder tank having a first particle size distribution;
    providing a second type of powder in said second powder tank having a second particle size distribution which is different to said first particle size distribution, wherein the smallest particle size in said second particle size distribution is smaller than the smallest particle size in said first particle size distribution;
    distributing a first sub-layer of said first type of powder on said work table;
    distributing a second sub-layer of said second type of powder on top of said first sub-layer of said first type of powder, where said first and second sub-layers are forming one of said at least one powder layers; and
    fusing said first and second sub-layers with a high energy beam from a high energy beam source so as to form a first cross section of said three-dimensional article.

2. The method according to claim 1, wherein said first particle size distribution is not overlapping in particle size with said second particle size distribution.

3. The method according to claim 1, wherein said first particle size distribution is partially overlapping in particle size with said second particle size distribution.

4. The method according to claim 1, wherein said first particle size distribution is in a range of approximately 75-105 µm and said second particle size distribution is in a range of approximately 25-45 µm.

5. The method according to claim 1, wherein the smallest particles in the first particle size distribution is at least three times as large as the largest particles in the second particle size distribution.

6. The method according to claim 1, further comprising the steps of:
    providing a first overflow container configured for receiving said first type of powder; and
    providing a second overflow container configured for receiving said second type of powder.

7. The method according to claim 6, wherein:
    said first overflow container is provided to a first side of build chamber;
    said second overflow container is provided to second side of said build chamber;
    said first powder tank is provided to the second side of said build chamber;
    said second powder tank is provided to the first side of said build chamber; and
    said first and second sides are opposite to each other.

8. The method according to claim 6, wherein:
    said first and second powder tanks are provided to a first side of said build chamber;
    said first overflow container is provided to a second side of build chamber; and
    said first and second sides are opposite to each other.

9. The method according to claim 1, wherein said work table is in the same position when applying said first and second sub-layers.

10. The method according to claim 1, wherein said work table is in a first position at a first distance from a top of said build chamber when applying said first sub-layer and in a second position at a second distance from the top of said build chamber when applying said second sub-layer, where said first distance is smaller than said second distance.

11. The method according to claim 10, further comprising the steps of:
  positioning said work table in a third position where a portion of a thickness of the powder layer is above the top of said build chamber; and
  removing said portion of the thickness of said powder layer before said fusion step.

12. The method according to claim 11, wherein said third position of said work table is between said first and second position of said work table.

13. The method according to claim 1, wherein said work table and said first and second powder tanks are provided in an enclosable chamber.

14. The method according to claim 13, wherein said enclosable chamber is a vacuum chamber.

15. The method according to claim 1, wherein said high energy beam source is at least one of an electron beam or a laser beam.

16. The method according to claim 1, further comprising the steps of:
  providing a first powder distributor for distributing said first sub-layer; and
  providing a second powder distributor for distributing said second sub-layer.

17. The method according to claim 16, wherein said first and second powder distributors are two physically separate powder distributors.

18. The method according to claim 16, wherein said first and second powder distributors are a single powder distributor being configured to change geometry.

19. The method according to claim 16, wherein said removal of powder is performed with a different powder distributor compared to the powder distributor which is used for providing said first or said second sub-layer.

20. The method according to claim 19, wherein said powder distributor for removal of powder is a physically separate powder distributors compared to said first and second powder distributor.

21. The method according to claim 19, wherein said powder distributor for removal of powder is provided on the same powder distributor as said first and second powder distributor.

22. A method for forming a three-dimensional article through successive fusion of parts of at least one layer of a powder bed provided on a work table in a build chamber, which parts corresponds to successive cross sections of the three-dimensional article, said method comprising the steps of:
  providing at least a first powder tank;
  positioning said work table in a first position at a first distance to the top of the build chamber;
  distributing a first layer of powder on said work table having a first thickness;
  positioning said work table in a second position at a second distance from the top of the build chamber, where said second distance is smaller than said first distance and where a portion of said first thickness of the powder layer is above the top of said build chamber;
  removing a portion of said first thickness of the layer of powder on said work table resulting in said first layer of powder having a second thickness, which second thickness is smaller than said first thickness; and
  fusing said first layer having said second thickness with a high energy beam from a high energy beam source so as to form a first cross section of said three-dimensional article.

23. The method according to claim 22, further comprising the steps of:
  providing a first type of powder in said first powder tank having a first particle size distribution;
  providing a second powder tank;
  providing a second type of powder in said second powder tank having a second particle size distribution which is different to said first particle size distribution, wherein the smallest particle size in said second particle size distribution is smaller than the smallest particle size in said first particle size distribution;
  distributing a first sub-layer of said first type of powder on said work table;
  distributing a second sub-layer of said second type of powder on top of said first sub-layer, where said first and second sub-layers are forming said first layer of said powder bed; and
  fusing said first and second sub-layers with a high energy beam, from a high energy beam source for forming a first cross section of said three-dimensional article.

24. The method according to claim 23, wherein said second sub layer is provided after having removed a portion of the thickness of said first sub layer on said work table.

25. The method according to claim 23, wherein a portion of the thickness of said second sub layer on said work table is removed before fusing said first and second sub layers simultaneously.

26. The method according to claim 22, wherein the smallest particle in the first particle distribution is at least three times as large as the largest particle in the second particle distribution.

27. The method according to claim 22, wherein the smallest particle size in said second particle size distribution is smaller than the smallest particle size in said first particle size distribution.

28. The method according to claim 23, further comprising the steps of:
  providing a first powder distributor for providing said first sub-layer; and
  providing a second powder distributor for providing said second sub-layer.

29. The method according to claim 1, wherein:
  said step of distributing said first sub-layer of said first type of powder on said work table comprises the step of raising a first floor in said first powder tank a predetermined distance, and
  said step of distributing said second sub-layer of said second type of powder on top of said first sub-layer of said first type of powder comprises the step of raising a second floor in said second powder tank a predetermined distance.

30. The method according to claim 29, wherein:
  said step of raising said first floor raises a corresponding thickness of said first type of powder above a top of said first powder tank;
  said step of raising said second floor raises a corresponding thickness of said second type of powder above a top of said second powder tank; and
  said method further comprises the step of raking said corresponding thicknesses of said first and said second types of powder from atop said first and second powder tanks and onto said work table.

31. The method according to claim 1, further comprising the step of providing a first layer of powder on top of a previously fused cross section of said three-dimensional article prior to distributing said first and second sub-layers.

32. The method according to claim 31, wherein said powder in said first layer is of said second type.

33. The method according to claim 31, wherein said powder in said first layer is sintered prior to distributing said first and second sub-layers.

34. The method according to claim 31, wherein said first layer is thinner than the sum of said first and second sub-layers.

35. The method according to claim 31, wherein said first layer of powder is less than half the thickness of the sum of said first and second sub-layers.

* * * * *